May 1, 1934.   R. L. NAFZIGER   1,956,978
CONTROLLING ENGINES, ETC
Filed May 17, 1929   2 Sheets-Sheet 1

Inventor
Ralph L. Nafziger
By Luther Johns
Atty.

May 1, 1934.    R. L. NAFZIGER    1,956,978
CONTROLLING ENGINES, ETC
Filed May 17, 1929    2 Sheets-Sheet 2
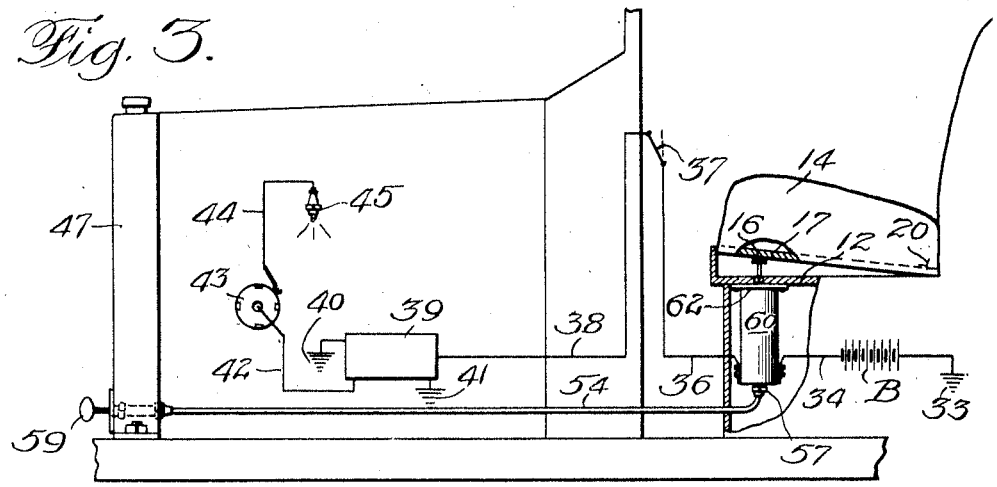
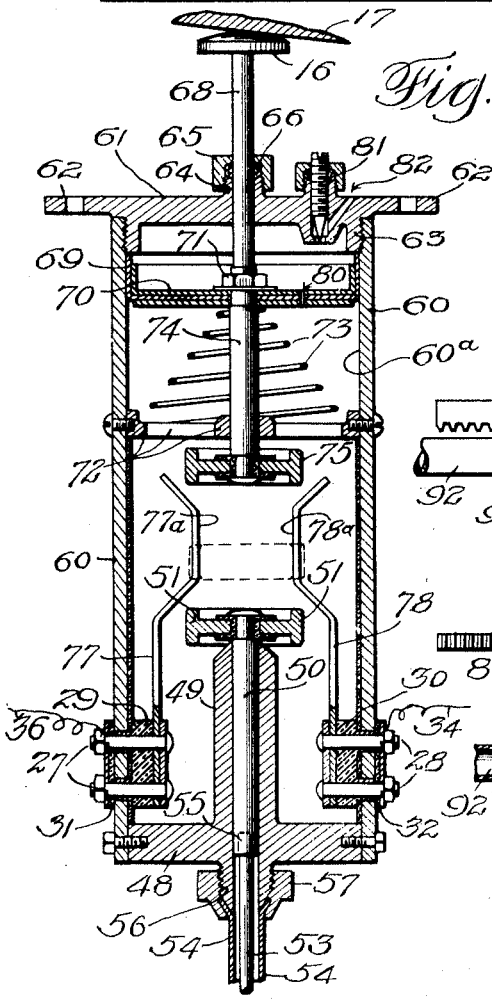
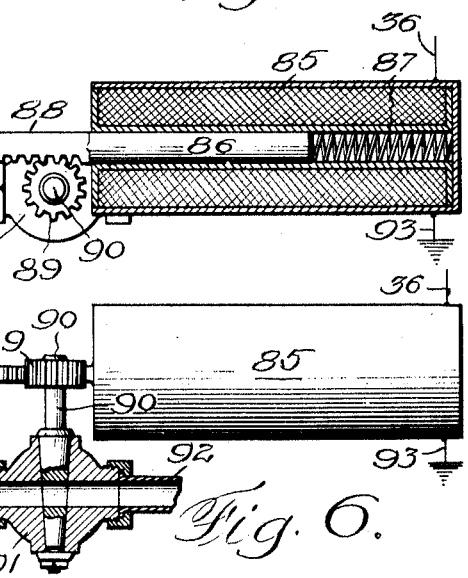
Inventor
Ralph L. Nafziger
By Luther Johns
Atty.

Patented May 1, 1934

1,956,978

UNITED STATES PATENT OFFICE 1,956,978

CONTROLLING ENGINES, ETC.

Ralph L. Nafziger, Kansas City, Mo.

Application May 17, 1929, Serial No. 363,836

9 Claims. (Cl. 180—82)

These improvements relate to means for controlling the operation of engines, with more particular reference to such as have a definite station for the operator.

One application of the invention would be to engines, whether electrical, steam, or internal combustion, in an automobile or other vehicle wherein the driver or operator is normally seated in the operating station.

The general objects are to avoid certain losses, effect economies of various kinds, and promote safety incident to the operation of such engines in service.

The prime specific object of the invention is to provide control means for the ignition circuit of an internal combustion engine whereby so long as the operator is normally seated in his station the engine may be operated, together with delayed-action means whereby the engine will automatically be stopped after the operator leaves his station for some substantial yet limited period of time. The invention contemplates that in an engine-driven vehicle the driver may leave his station to perform various duties, such as making a delivery of goods, investigating a traffic jam, seeing whether a railroad crossing is clear, etc., and return to the vehicle to find the engine still running, while, should he take more than the prescribed time for such duties, he would return to find the engine stopped. Other objects are the provision of advantageous constructional details for such a device. According to the illustrations herewith the engine may idle indefinitely, so long as the operator is in his station, and he need do nothing to that end but remain seated. A delayed action for stopping, therefore, in my device does not depend upon the running of the engine or of the vehicle, or upon clock timing, or upon the circuit as an adjunct to stopping, or upon temperature, or upon whether or not the engine is connected up by the clutch with the transmission mechanism, etc. On the driver's simply leaving his seat the engine will either stop at once or idle awhile, according to the form of device employed, whether the engine be then idling or running the vehicle.

Where I attain results old in themselves I do so in a more simple and direct way, and according to improved and better means, methods and principles; but I accomplish hereby new and improved results also.

In the drawings Figure 1 is a fragmentary view showing certain automobile parts with portions thereof at the seat in section, and with the operating circuit diagrammatically shown in connection with a seat-operated switch device.

Fig. 3 is a view similar to that of Fig. 1 showing another form of the seat-switch;

Fig. 4 is a view similar to Fig. 2 showing the details of the seat-switch of Fig. 3;

Fig. 5 is a partly sectional view showing the invention applied to the operation of a valve; and Fig. 6 is a view, with other details in section, of the device of Fig. 5, turned ninety degrees on its longitudinal axis.

Figure 1:
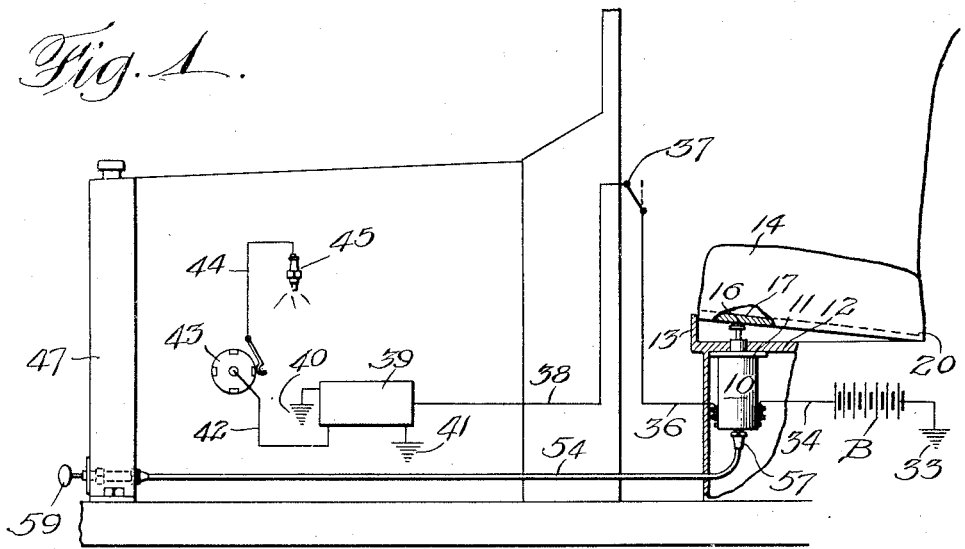
Figure 2:
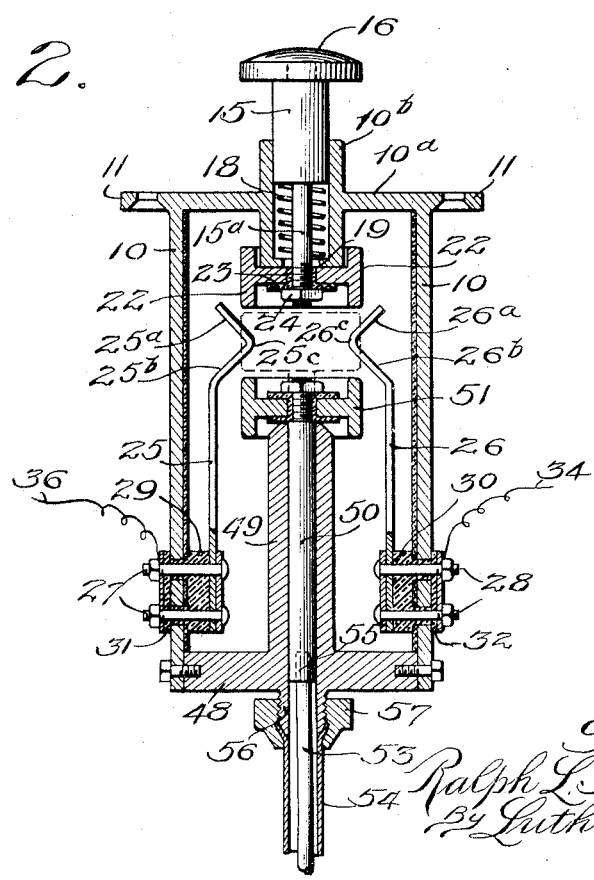
Fig. 2 is an enlarged vertical medial section of the seat-switch device.

The device of Figs. 1 and 2 is the preferred construction where it is desired to stop the engine or other device as soon as the operator arises from his seat at the operator's station, while Figs. 3 and 4 show the preferred construction where it is desirable to provide some delay in the actuation of the seat-switch after the operator moves away from his station.

Referring to Fig. 2, the casing 10 is in the form of a hollow casting circular in shape, with a flange 11 at the top whereby the switch device as a whole may be secured by screws to the board (Fig. 1) 12 having the upstanding lip 13 and constituting the main support for the seat 14.

Centrally of the top wall 10a of the housing 10 is an integral tubular element 10b through which extends the plunger 15 having a head 16 adapted to contact the bottom board 17 (Fig. 1) of the seat 14. A coil spring 18 resting on an annular shoulder 19 of the part 10b and surrounding the stem 15a of the plunger tends to force the plunger upward. From Fig. 1 it will be clear that the seat 14 is mounted for upward and downward movements. A hinge is not necessary at the back, as the seat is adapted normally to rock at its lower rear edge portion 20 when the front end of the seat is raised and lowered. The weight of a person on the seat forces it and the plunger downward against the expansion pressure of the spring 18, and when the person moves away from the seat that spring moves the plunger upward and thereby restores the seat and the plunger to their initial positions respectively, as shown by Figs. 1 and 2.

The stem 15a (Fig. 2) carries a circular contact element 22, with insulation 23 maintaining the element 22 out of electrical contact with the stem 15a on which the insulation 23 is threaded, and also out of electrical contact with the nut 24 holding the element 22 rigidly upon the stem 15a.

A pair of contact brushes 25 and 26 have downwardly-and-inwardly slanting parts 25a and 26a followed by outwardly-and-downwardly slanting parts 25b and 26b respectively, the contact surfaces 25c and 26c respectively being in the downward path of movement of the circular contact maker 22. The lower ends of the metallic strip metal brushes 25 and 26 are held by a pair of screws 27 and 28 to the housing wall, with insulation at 29 and 30 and also at 31 and 32 respectively maintaining the brushes and the bolts out of electrical contact with the housing.

From the description thus far given it will be clear that when the operator sits upon the seat 14 the contact maker 22 will, in its downward movement, force the springy brushes 25 and 26 in directions apart and complete the circuit through them and the intervening element 22. The circuit-making position of the element 22 is shown by the rectangular dotted lines in Fig. 2.

Turning to Fig. 1, the battery B is grounded at 33 and is connected by a conductor 34 to switch element 26, while the switch element 25 is connected to conductor 36, shown in Fig. 1 as leading to the usual dashboard switch 37. The circuit thence continues through conductor 38 to the spark coil 39, the primary of which may be assumed to be grounded at 40 while the secondary, grounded at 41, communicates through conductor 42 with the timer 43, whence the current passes through conductor 44 to the spark plug 45.

Assuming the dash-switch 37 to be closed the ignition circuit is open at the seat-switch until the plunger 15 is depressed. That open position of the seat-switch is shown in Fig. 2, and the raised position of the seat 14 at that time is shown by Fig. 1. The operator now sits upon the seat 14 preparatory to starting the engine. By that act he closes the seat-switch to render the ignition circuit operative. Ordinarily he sits upon the seat in the driver's station first and then closes the dash-switch 37, but in any event the ignition circuit is not closed until he seats himself in his station. The engine may now be started, and it may be observed in this connection that at any time the driver moves off of his seat or rises therefrom, whether the engine be idling or connected up with the vehicle so as to propel the same, the circuit will be broken at the seat-switch and the engine immediately stopped according to the device of Figs. 1 and 2.

Some automobiles, notably trucks, still remain unequipped with electrical starters, and in such instances the operator must crank the car from a place in front of the radiator 47. When he removes his body from the seat he thereby disconnects the circuit. I therefore provide means whereby he may tentatively and provisionally restore the ignition circuit for purposes of starting the car by cranking.

From Fig. 2 note that the bottom closure 48 of the casing 10 has an upwardly-projecting hollow stem 49 through which passes for sliding movement a shaft 50 having secured at its upper end, and in insulated relation thereto, a contact maker 51 which is in all material respects like the contact maker 22. The plunger 15 and the shaft 50 as well as the contact makers 22 and 51 are coaxial. If the shaft 50 were moved upward the contact maker 51 would occupy the rectangular dotted line space in Fig. 2 and, being in that position, would complete the circuit to the same effect as does the contact maker 22.

Means for moving the shaft 50 upward are shown as comprising what is known as a Bowden control, but other means may be employed.

The Bowden control consists of a push or pull wire as 53 surrounded by a tube as 54, which tube may be a closely-wound helix of wire, a piece of metallic piping or some other appropriate tubular means for constraining the wire 53 whereby it may slide within the casing as 54 while exerting push and pull strains through a variety of directions accordingly as the device as a whole is conducted to a remote place for operation. Fig. 2 shows that the wire 53 is rigidly secured at 55 to the shaft 50 while the sheathing or casing 54 is tightly held to the nipple 56 by a clamping nut 57. There is nothing new in the details of this Bowden control as such. The Bowden control, indicated in Fig. 1, is led from the seat switch to the radiator 47 where the tubular casing 54 is rigidly connected to the radiator while the wire 53 will be understood as being directly connected to the push button 59.

When the operator wants to start the car from in front he pushes upon the button 59, thereby completing the circuit through the element 51 (Fig. 2) and this element remains in its raised or dotted line position through frictional contact as well as through the friction provided by the elements of the Bowden control. After starting the engine the operator seats himself in his station, and by that act pushes the connector 51 out of its dotted line position and into its full line position in Fig. 2, and at the same time substitutes the connector 22 for the connector 51 so that the circuit remains operative to run the engine.

Turning to Fig. 4 the casing 60 is suitably a piece of metal tubing. At the top it has a cover 61 having an annular flange 62 for securing the device as a whole to the seat-supporting board as 12, with an inwardly-directed annular flange 63 exteriorly threaded to engage interior threads at the upper end of the tubing 60. Centrally of the cover 61 is a threaded nipple 64 adapted to accommodate the screw cap 65 with packing 66 between these two elements, the construction here illustrating a simple form of packing gland.

The plunger 68 passes through the gland 64—65 and cover 61, and within the housing has secured to it a piston 70, as by the nut 71. The piston 70 may be considered to have a leather element upturned and cup-shaped and held in expanded position by metal parts. Such pistons are well knwon, and any suitable piston may be employed.

The piston chamber is marked 60a. Below the piston 70 and within the chamber 60a and resting on a spider 72 is a conically-shaped coil spring 73, the effect of which is to force the piston upward, and consequently the head 16 bearing against the board 17 of the seat 14, and raising the seat to initial position as in Fig. 3 when the driver is away from his station.

The plunger or piston rod 68 has an integral, co-axial extension 74 extending centrally through the spider 72, and at the lower end of this rod 74 is a contact maker 75 in all respects like contact maker 22 of Fig. 2 and calling for no further description. The brushes 77 and 78 correspond respectively to brushes 25 and 26 of Fig. 2 and their connections at the bottom will be given the same reference characters and without further description. These brushes depart from the similar ones of Fig. 2 in that the contact-making surfaces at 77a and 78a are substantially long in the direction of movement of the contact maker 75, whereby, when the person is seated in his station, the contact maker 75 descends a materially great distance and substantially to the bottom of these contact surfaces 77a and 78a.

Considering the contact maker 75 as being forced downward into the dotted line position thereof in Fig. 4, the piston 70 will correspondingly move downward. The necessary air for supplying the space above the piston passes around the leather bushing 69, so that the piston will descend readily. However, on the upward movement of the piston, which takes place when the operator gets off or rises from the seat, the air above the piston is trapped so that with a limited escape of air the return of the parts to initial position as shown by Figs. 3 and 4 will be slow. At 80 (Fig. 4), I have shown a very small duct through the horizontal wall of piston 70. This is at a place where the operator may not interfere with it, and is provided so that in any event the spring moving the piston will have returned the seat 14 and contact maker 75 to initial position in some reasonably short period of time. It may be desirable, however, to reduce the delay of actuation of the switch to break the ignition circuit beyond that provided by the duct 80 and incident leakage, and to this end I have provided the needle valve 81 which discharges through a port 82 at a rate determined by the position of the valve 81.

One advantage of such delayed action arises in connection with cranking the car, for, should the operator seat himself at his station, thus completing the circuit, he could get out and crank the car and get back to his seat before the delayed action would have broken the connection at 75, 77 and 78. While the piston is slowly moving upward the connection element 75 is sliding upward along the surfaces 77a and 78a at the same rate.

Another advantage of the delayed action is in situations where the operator may be called upon to leave his station temporarily with the engine idling. He may do so for such a reasonable period as may be determined upon by the construction or adjustment of the parts without having to start the engine afresh. It is a habit of truck drivers to leave their engines idling unnecessarily, as in making deliveries, having their lunch, etc. According to the present device this will not happen, as the engine will be summarily stopped when the operator moves away from his station, according to Figs. 1 and 2, or the engine will be permitted to idle a short while according to Figs. 3 and 4. Should the driver merely desire to take a package to a customer's door it is preferable that the engine idle for such a short space of time as may be necessary; but should the absence from the car turn out to be of a materially great length of time the engine will be found to have been automatically stopped.

I have shown in connection with Figs. 3 and 4 the same Bowden control device for restoring the circuit from the front of the car should cranking be desired. It might conceivably happen that the cylinder-and-piston device might, because of long neglect, prove inoperative to hold the contact maker 75 down the desired length of time, and it would be advantageous in such an emergency to have the Bowden control device or some other means available for completing the circuit to get the engine started. The device may be variously organized according to particular requirements and, from the manufacturing standpoint it would be advantageous to provide in a single construction for the use of this resetting or emergency feature in the same mechanical organization, thus limiting the number of basic constructions which might be called for. This Bowden control feature of Figs. 3 and 4 operates in all respects as already described in connection with Figs. 1 and 2, and its parts will be given the same reference characters respectively, and without further description.

Similarly the circuit for Fig. 3 will be given the same reference characters as in Fig. 1, and no further description of the device of Figs. 3 and 4 in this respect is needed.

In Figs. 5 and 6 we have a solenoid 85 with its core 86 pressed forward by a spring 87, the core being connected with a rack 88 travelling over the pinion 89 on the stem 90 of the valve 91 in the fuel train 92. When the solenoid is energized the core 86 is drawn inward and the valve stem 90 is rocked either to close or open the valve in some particular arrangement. For the present purposes let us consider one terminal of the solenoid winding to be the conductor 36 leading from the seat-switch of either Figs. 1 or 3, with the outgoing terminal 93 grounded. The action then would be such that when the operator sits in his operating station, which we will assume to be a seat as 14, the seat switch is operated to close the circuit, thereby energizing the solenoid 85, and we will assume that thereby the valve 90, 91 is operated to open the fuel train 92. When the operator moves away from his station the solenoid is de-energized and the spring 87 forces the plunger out and moves the valve to closed position.

I contemplate as being included in the present invention all such changes, departures and modifications from what is thus specifically illustrated and described as fall within the scope of the appended claims.

I claim:

1. The combination with an internal combustion engine adapted to be started, run continuously at will and stopped, having an ignition circuit, and having an operator's station including a seat movable downward under the influence of weight of the operator thereon, a part movable in response to the downward movement of the seat, with means for restoring said part to initial position with a materially delayed action when the operator rises from the seat, of a switch device including a pair of contact members for controlling said circuit, means dependent upon the movement of said part when the same is being restored to initial position for actuating said switch to render the circuit inoperative at said contact members, and manually-controlled means for rendering the circuit operative at said contact members when said part is in its initial position.

2. In a switch device of the character described, the combination of a housing, a stem extending through and mounted to reciprocate in said housing, switch contact members within the housing, means controlled by the reciprocating movements of said stem for making and breaking a circuit at said contact members, spring means for causing said stem to move in one direction, and means within the housing for causing a slowed action of said spring means.

3. In a switch device of the character described, the combination of a cylindrical housing, a stem extending through and mounted to reciprocate in said housing, switch contact members within the housing, means controlled by movements of said stem for making and breaking a circuit at said contact members, spring means within the housing for causing said stem to move in one direction, and piston means within the housing for causing a slowed action of said spring means.

4. In a switch device of the character described, the combination of a housing, a stem extending through and mounted to reciprocate in said housing, switch contact members within the housing, means controlled by movements of said stem for making and breaking a circuit at said contact members, spring means for causing said stem to move in the circuit-breaking direction, and means within the housing for causing a slowed action of said spring means to delay the circuit-breaking action.

5. In a switch device of the character described, the combination of a housing, a stem extending through and mounted to reciprocate in said housing, switch contact members within the housing, means controlled by movements of said stem for making and breaking a circuit at said contact members, spring means for causing said stem to move in the circuit-breaking direction, means within the housing for causing a slowed action of said spring means to delay the circuit-breaking action, and means under the control of the operator for completing the circuit through said contact members independently of said means which are controlled by the movements of said stem.

6. In a switch device of the character described, the combination of a housing, a stem extending through and mounted to reciprocate in said housing, switch contact members within the housing, means controlled by movements of said stem for making and breaking a circuit at said contact members, spring means for causing said stem to move in the circuit-breaking direction, means within the housing for causing a slowed action of said spring means to delay the circuit-breaking action, means under the control of the operator for completing the circuit through said contact members independently of said means which are controlled by the movements of said stem, said means under the control of the operator being adapted to be rendered inoperative to complete the circuit when said means which are controlled by the movements of said stem are moved into circuit-making position.

7. In a switch device of the character described, the combination of a housing, a stem extending through and mounted to reciprocate in said housing, switch contact members within the housing, means controlled by movements of said stem for making and breaking a circuit at said contact members, spring means for causing said stem to move in one direction, and auxiliary means partly within and partly without the housing and being under the control of the operator for completing the circuit at said contact members independently of said means controlled by the movements of said stem.

8. The combination with an internal combustion engine adapted to be started, run continuously at will and stopped, having an ignition circuit, and having an operator's station including a seat movable downward under the influence of weight of the operator thereon, with means for moving the seat upward when the operator rises therefrom, means under the control of the alternate downward and upward movements of said seat for rendering said circuit operative and inoperative respectively, together with means for delaying, for such a substantial yet limited period, as will enable the operator to leave said seat and perform duties away from the engine, the action which renders the circuit inoperative.

9. The combination of claim 8 hereof in which said last-mentioned means are adjustable to vary the period of such delayed action.

RALPH L. NAFZIGER.